3,265,523
METHOD OF PREPARING TRANSPARENT LUMINESCENT SCREENS

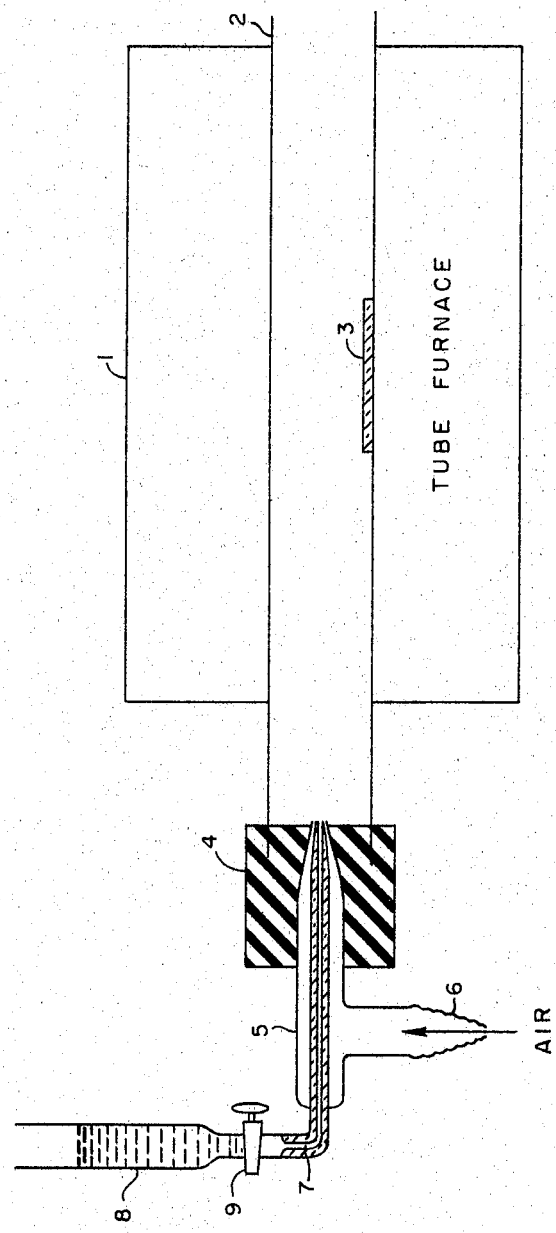
INVENTORS
JAMES H. SCHULMAN
PETER KING
RUSSEL D. KIRK

James H. Schulman, Forest Heights, and Russell D. Kirk, Temple Hills, Md., and Peter King, Wellington, Va., assignors to the United States of America as represented by the Secretary of the Navy
Filed Nov. 2, 1961, Ser. No. 149,789
4 Claims. (Cl. 117—33.5)

The invention described herein may be manufactured and used by or for the Government of the United States of America for governmental purposes without the payment of any royalties thereon or therefor.

This invention relates to luminescent screens for cathode ray tubes, more particularly to a method for preparing a transparent luminescent metal silicate layer on a transparent silica-containing glass base.

Conventional cathode ray tube screens have a powder phosphor and are known to scatter and reflect light which lessens contrast and image definition especially in areas of high level ambient light. Transparent luminescent screens are known to have the advantage of minimizing light scattering and reflection in operation of cathode ray tubes and give better contrast and image definition than the powder phosphor screens.

It is an object of the present invention to provide a method for preparing transparent luminescent screens in which a transparent luminescent metal silicate layer is directly and quickly formed on the surface of a transparent silica-containing glass base.

We have found that the above and other objects can be accomplished by the method of our invention in which a luminescent zinc or cadmium silicate layer containing a metal luminescence activator dispersed therein is quickly formed in situ on the surface of a transparent silica-containing glass base by atomizing a solution of the corresponding metal halide and a halide of the metal luminescence activator in a suitable solvent and flowing the resulting fine spray onto the surface of the transparent silica-containing glass base which is heated to a temperature in the range of from about 400 to 1000° C. Reaction between the spray deposit and the hot, preheated glass takes place very quickly, in a matter of seconds, to form the transparent luminescent metal silicate layer on the glass.

Solutions of the halide of zinc or of cadmium may be prepared by dissolving them in an alcohol, such as methanol, ethanol, isopropanol, etc., or in water or in mixtures of an alcohol and water, for example, in mixtures of one of the aforementioned alcohols with water in proportions by volume of from 5 to 95% of the alcohol to from 95% to 5% of water. The halide may be the chloride, bromide, iodide or fluoride with the chloride being generally preferable with the exception that the iodide of cadmium is preferable where methanol is the solvent due to the outer solubility of the iodide in methanol. The concentration of the zinc or cadmium halide in the solution is not critical and may vary, for example, from about 10 to 50% by weight. The metal luminescence activator may be manganese or titanium. The chlorides of these metals are satisfactory for make-up of the solutions, with titanium tetrachloride being used for solutions in which an alcohol is the solvent. The metal luminescence activator is used in small amounts corresponding to those employed in the conventional powder phosphors. Suitable concentrations of the halides of the metal activator in the solutions may range from about 0.1 to 10% by weight.

Transparent silica-containing glasses which have a softening point not below about 400° C. are suitable for the base or substrate in the preparation of the luminescent screens by the method of the invention and include clear soda-lime-lead- and borosilicate glasses (Pyrex), as well as 96% silica (Vycor) and silica (fused silica) glasses.

Formation of phosphor layers on the transparent glass base by the method of the invention involves reaction between the zinc or cadmium from the sprayed solution with silica of the substrate glass. The temperature to which the glass is heated may be varied within the range defined above with the upper limit being below that at which softening results in sagging of the glass and the minimum that at which silica is available from the glass for reaction with the zinc or cadmium of the spray deposit. For the harder glasses, such as Pyrex, Vycor and fused silica glasses, a favorable temperature to which the glass is heated at the time of contact of the solution spray therewith is from about 800 to 1000° C.

An apparatus of a type suitable for carrying out the method of the invention is shown in schematic manner in the single figure of the accompanying drawing.

Referring to the drawing, a furnace which may be of the tube or muffle type is shown at 1 equipped with a tube or muffle 2 of fused silica. The transparent silica-containing glass base is shown at 3 arranged in the tube 2 for contact of the fine spray of solution therewith. The tube 2 may be of circular or rectangular cross-section. Where it is of circular cross-section, the glass base 3 may be raised from the floor of the tube by means of suitable refractory supports made, for example, of high-purity graphite or acid-extracted porous alumina supports. A seal 4 of silicone rubber, shown in cross-section, receives the tube 2 in gas-tight relation and provides a support for the nozzle section of an atomizer 5 which extends therethrough in gas-tight relation, as shown. The atomizer 5 has an extension 6 for connection to an air line and is an all-glass, direct spray, peripheral air-jet atomizer of the "Chicago" type having a tapered tip and an orifice centered within the jet. The atomizer is connected by glass capillary tubing 7 to a glass tube reservoir 8 containing the solution of the zinc or cadmium halide and the halide of the metal luminescent activator. Feed of the solution is by gravity and a stop-cock 9 is provided in the supply line for control of flow to the atomizer. A suitable exhaust system (not shown) is connected to the tube 2 for removal of exit gases.

Application of the method of the invention is illustrated by the preparation of the several transparent screens described in the table below. In preparing these screens, an apparatus as described above was employed using an atomizer 5 in which the orifice diameters were liquid—1.52 mm. I.D., 2.36 mm. O.D. and air—2.80 mm. I.D. A line air pressure of 16 p.s.i. was applied at the air intake 6 to give a liquid flow rate of approximately 0.33 ml./sec. for the solutions used. Total spray discharge times were thus 6 to 15 seconds. Methanol solutions of zinc chloride (50% by weight concentration) containing a small amount of manganese chloride ($MnCl_2$) and titanium tetrachloride ($TiCl_4$), respectively, were used for preparing the zinc silicate phosphors and a methanol solution of cadmium iodide (saturated) and a small amount of manganese chloride was used for preparing the cadmium silicate phosphor. The glass substrates were Pyrex #7740 sheets, sections of fused silica laboratory tubing and polished fused silica microscope slides of convenient size and presenting a surface area intended for contact by the spray of about 2 square inches. The amount of the solution sprayed in each instance was from 2 to 5 ml. The Pyrex glass substrates were supported in the furnace tube by means of high-purity graphite and acid-extracted porous alumina supports since some of the spraying was done at temperatures above the softening point of the glass.

TABLE

| Phosphor | Substrate Glass | Atoms Activator per atom Zn or Cd, Solution | Deposition Temp., °C. | Refiring Conditions | Emission Peak, Å[1] | Brightness, ft.-L[1] |
| --- | --- | --- | --- | --- | --- | --- |
| α-$Zn_2SiO_4$: Mn | Silica | 0.01 | 900 | 1,250° C. for 1 hr | 5,240 | 22 |
| α-$Zn_2SiO_4$: Mn | Pyrex | 0.01 | 900 | None | 5,190 | 4 |
| β-$Zn_2SiO_4$: Mn | ----do---- | 0.01 | 900 | ----do---- | 5,700 | 3 |
| $Zn_2SiO_4$: Ti | ----do---- | 0.07 | 850 | ----do---- | 3,950 | 1 |
| $Zn_2SiO_4$: Ti | Silica | 0.07 | 850 | 1,000° C. for 1 hr | 3,900 | 2 |
| $CdSiO_3$: Mn | ----do---- | 0.006 | 1,000 | 1,150° C. for 1 hr | 5,900 | 27 |

[1] At 7.5 kv. and 10 microamps./cm.[2].

The temperatures noted in the fourth column of the table are for the glass just before spraying and measured by means of a thermocouple 1 mm. above the surface of the glass.

The phosphor films on the glass substrates of the table were tested in a demountable cathode ray tube at 7.5 kv. and about 10 microamps./cm.[2] beam current using a conductive tin oxide backing layer on the glass substrate. All the values in the table are, therefore, for the phosphor films with the backing layer of tin oxide on the glass. Emission spectra were obtained with a calibrated radiometer. Brightness measurements were obtained with a Spectra Brightnes Spotmeter (½° ultrasensitive model, Photo Research Corp., Hollywood, Calif.) focused on the luminescent film; with readings being made directly in foot-lamberts.

The phosphor films on the silica (fused silica) glass base were refired in air at the temperature and for the time noted in the table to improve the brightness of the phosphor. The temperature and time of refining may be varied and carried out at temperatures of about 800° C. up to those which lie below that at which softening of the fused silica glass takes place.

While the invention has been described herein with reference to specific embodiments thereof, it is intended that such shall be taken by way of illustration and not in limitation except as may be defined in the appended claims.

What is claimed is:

1. A method of preparing a luminescent screen having a transparent luminescent metal silicate layer formed in situ on the surface of a silica-containing transparent glass base having a softening point not below about 400° C., said layer containing manganese as a luminescence activator, which comprises air-atomizing a solution of a metal halide of the group consisting of zinc chloride and cadmium iodide and a small amount of manganese chloride in methanol and flowing the resulting fine spray onto the surface of the silica-containing transparent glass base heated in air to a temperature in the range of from about 400 to 1000° C. with formation of a transparent luminescent metal silicate film thereon.

2. A method of preparing a luminescent screen having a transparent zinc silicate layer formed in situ on the surface of a silica-containing transparent glass base having a softening point not below about 400° C., said layer containing manganese as a luminescent activator, which comprises air-atomizing a solution of zinc chloride and a small amount of manganese chloride in methanol and flowing the resulting fine spray onto the surface of the silica-containing transparent glass base heated in air to a temperature in the range of from 400 to 1000° C. with formation of a transparent luminescent zinc silicate film thereon.

3. A method of preparing a luminescent screen having a transparent cadmium silicate layer formed in situ on the surface of a silica-containing transparent glass base having a softening point not below about 400° C., said layer containing manganese as a luminescence activator, which comprises air-atomizing a solution of cadmium iodide and a small amount of manganese chloride in methanol and flowing the resulting fine spray onto the surface of the silica-containing transparent glass base heated in air to a temperature in the range of from about 400 to 1000° C. with formation of a transparent luminescent cadmium silicate film thereon.

4. A method of preparing a luminescent screen having a transparent luminescent metal silicate layer formed in situ on the surface of a fused silica base and containing manganese as a luminescence activator, which comprises air-atomizing a solution of a metal halide of the group consisting of zinc chloride and cadmium iodide and a small amount of manganese chloride in methanol flowing the resulting fine spray onto the surface of the fused silica base heated in air to a temperature in the range of from about 800 to 1000° C. with formation of a transparent luminescent metal silicate film thereon and refiring said film on the fused silica base in air at a temperature in the range of about 800° C. up to below the softening point of the fused silica base and for a time sufficient to improve the luminescent brightness of said film.

References Cited by the Examiner

UNITED STATES PATENTS

| | | | |
| --- | --- | --- | --- |
| 2,435,435 | 2/1948 | Fonda | 252—301.4 X |
| 2,685,530 | 8/1954 | Cusano et al. | |
| 2,983,816 | 5/1961 | Koller et al. | |
| 3,075,861 | 1/1963 | Bennett | 117—229 |

WILLIAM D. MARTIN, *Primary Examiner.*

RICHARD D. NEVIUS, *Examiner.*

S. W. ROTHSTEIN, R. E. ZIMMERMAN,
*Assistant Examiners.*